No. 623,929. Patented Apr. 25, 1899.
J. H. ROBINSON.
LIFE SAVING GUARD FOR STREET CARS.
(Application filed Mar. 5, 1898.)
(No Model.) 2 Sheets—Sheet 2.
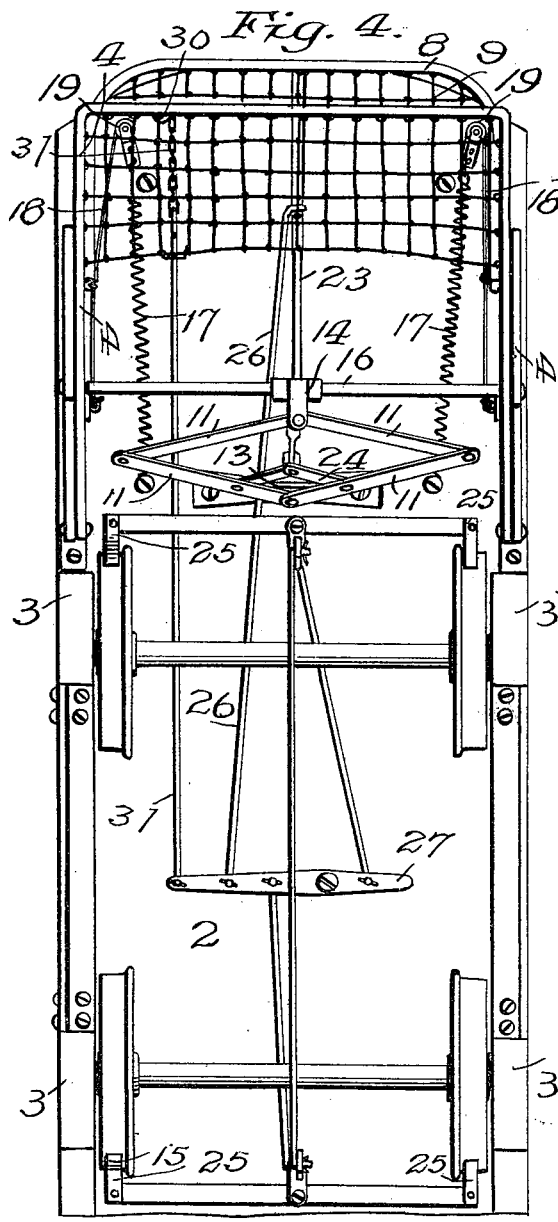
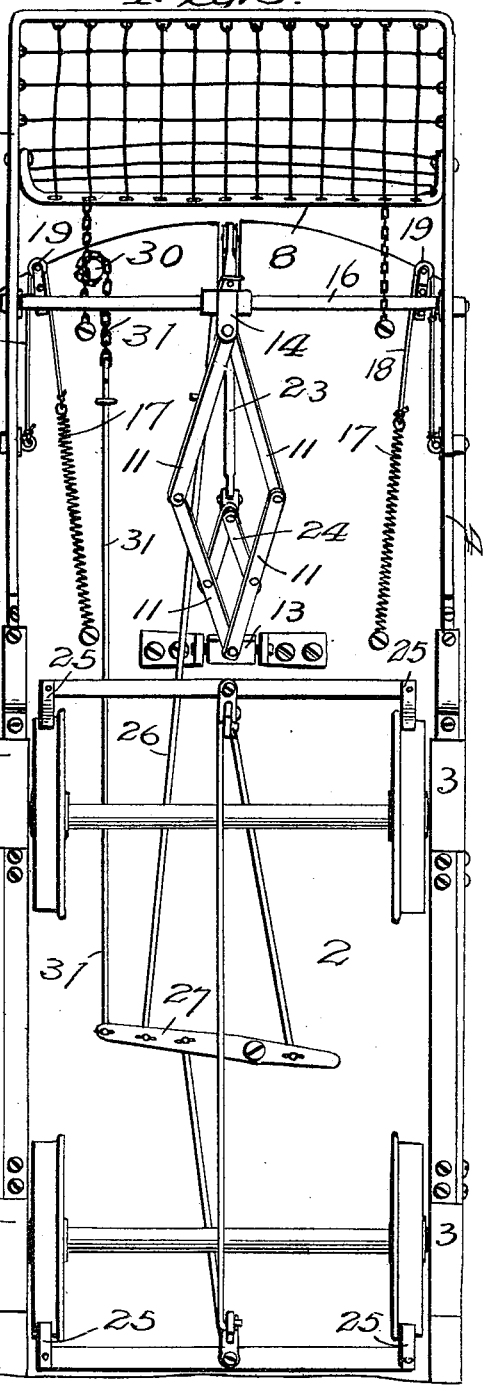
Witnesses:
C. E. Van Dorn
W. C. Gooley
Inventor:
James H. Robinson.
By Paul O. Hawley
his attorneys.

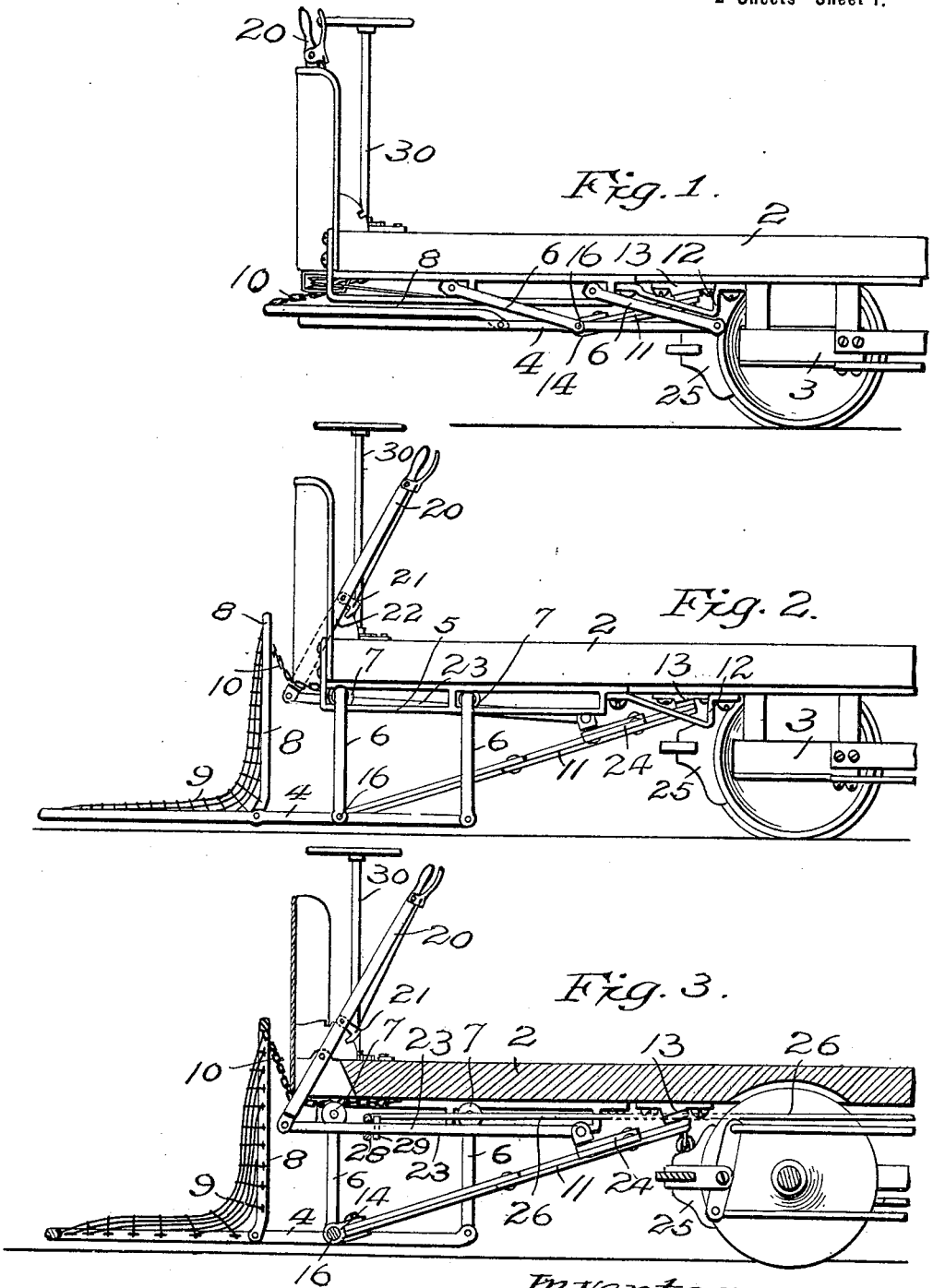

UNITED STATES PATENT OFFICE.

JAMES H. ROBINSON, OF MINNEAPOLIS, MINNESOTA, ASSIGNOR OF THREE-FOURTHS TO HIRAM H. THAYER, OF SAME PLACE.

LIFE-SAVING GUARD FOR STREET-CARS.

SPECIFICATION forming part of Letters Patent No. 623,929, dated April 25, 1899.

Application filed March 5, 1898. Serial No. 672,647. (No model.)

*To all whom it may concern:*

Be it known that I, JAMES H. ROBINSON, of the city of Minneapolis, county of Hennepin, State of Minnesota, have invented certain new and useful Improvements in Life-Saving Guards for Street-Cars, of which the following is a specification.

The invention relates to life-saving guards or fenders; and the objects of the invention are to provide a fender or guard particularly adapted for use on street-cars; to provide means in connection with the fender or guard whereby the motorneer by a single movement of a lever can simultaneously set the brakes and throw the fender forward upon the track; further, to provide means whereby the brake mechanism can be operated independently of the mechanism for operating the fender.

The invention consists in a folding fender or guard supported beneath a car, in combination with means within the control of the motorneer for projecting or throwing the fender forward upon the track in front of the car and returning it to its normal position; and, further, the invention consists in a fender supported beneath a car, combined with a lever mechanism coupled with said guard or fender and with the brakes whereby with one movement the fender may be projected and the brakes set.

Further, the invention consists in a mechanism for operating the fender and brake simultaneously by a single movement of a lever and yet permitting the brake-rods to be operated independently when desired; and, further, the invention consists in various constructions and combinations, all as hereinafter described, and particularly pointed out in the claims.

The invention will be more readily understood by reference to the accompanying drawings, in which—

Figure 1 is a side view of the forward end of a car with a folding guard or fender embodying my invention attached thereto. Fig. 2 is a similar view showing the guard projected. Fig. 3 is a vertical section of the same. Fig. 4 is a plan view from beneath. Fig. 5 is a plan view from beneath with the fender extended as in Figs. 2 and 3.

In the drawings, 2 represents the car-platform, supported by the wheeled truck 3. In front of the truck and depending from the under side of the platform 2 are the parts of the fender or guard. The main frame 4 of the guard is hung from the guides 5 upon opposite sides of the platform by links 6. Anti-friction-rollers 7 are preferably provided at the upper ends of the links 6 to travel in the guides 5, and the same have a movement therein that is substantially equal to the length of said links 6. The guard is completed by the pivoted frame 8, pivotally attached to the frame 4 at points forward of the front links 6. The space between the frames 4 and 8 is filled with a netting 9 or with a suitable apron. The free or upper end of the pivoted frame 8 is attached to the forward end of the platform by cords or chains 10, which hold the free end thereof in position, while the lower end is projected with the frame 4. The normal position of the fender is close beneath the platform 2, as shown in Fig. 1, in which position it is supported by the retracted toggle-levers 11 and the engagement with the rear ends of the frame 4 with the buffers 12. The toggle-levers 11 are swiveled to the platform by a block 13 and are connected with the frame 4 by a swiveled block 14 on the cross rod or shaft 16, which forms a part of said frame 4. The upper ends of the links 6 are drawn forward by the springs 17, connected therewith by cords or chains 18, preferably passing over pulleys 19 at the forward end of the platform. The upper ends of the links are tied together by said cords or chains 18.

20 is the operating-lever, pivoted on the platform and adapted to be locked in either of two positions by means of the latch 21 and quadrant 22. This lever is connected with the toggle-levers 11 by a rod 23 and the smaller toggle-levers 24, pivoted on the end of the rod 23 and having their ends pivoted near the fixed pivot-point of the toggle-levers 11. The usual brake shoes and beams 25 are connected with the lever 20 by a rod 26, connected with the main brake-lever 27. The connection of the forward end of the rod 26 with the lever-rod 23 is made by means of a chain or by a slip connection, comprising a loop 28 on the rod 26 sliding on the rod 23 to engage a pin or collar 29 thereon as the rod 23 approaches its extreme forward position.

30 represents the usual brake-stand, that is connected with the main brake-lever 27 by the rod and chain 31. Owing to the sliding connection between the rod 26 and the rod 23 the brake-stand may be used independently of the guard-throwing lever 20.

The operation of the device is as follows: The lever 20 being grasped by the motorneer and thrown forward, the toggle-levers 11 will be projected or distended through the medium of the rod 23 and the minor toggle-levers. This operation of the levers 11 will throw the frame downward and forward, and the upper ends of the links 6 will be drawn forward by the spring 17, so that the links will occupy vertical positions and with the projecting force of the levers 11 will hold the frame 4 steadily and firmly. When the frame 4 is projected, the hinged frame 8 will be dropped therewith, and its upper end being held by the chains 10 the frame 8 will assume the position shown in Figs. 2 and 3 and the netting or apron of the guard or fender will be stretched between the frames 4 and 8. The frame 4 drops to a point close to the track and will remain parallel thereto, being prevented from sagging by the parallel links 6.

As the lever 20 is drawn back to project the fender the brakes will be operated through the rod 26, that is drawn forward with the rod 23 during the final movement thereof. Thus with one movement the motorneer may project the fender and also set the brakes and stop the car. When the lever 20 is thrown forward again, the toggle-levers 11 will be retracted, as shown in Figs. 1 and 4, and the frame 4 will be drawn up and back to fold the two parts of the fender snugly beneath the platform, in which position it is held by the combined operation of the link 6, drawn back to the ends of the guides 5, the levers 11, and the buffers 12, which depress the rear ends of the frame 4, and thus raise or support the forward end thereof to prevent the sagging of the fender. As before explained, the ordinary brake mechanism may be used at any time without regard to the position of the fender.

The detail construction of my combined guard or fender and brake-setting mechanism may be altered without departing from the spirit of the invention, and I do not confine the invention to the specific construction herein shown and described.

Having thus described my invention, I claim as new and desire to secure by Letters Patent—

1. The combination, with a car, of a fender or guard sliding and pivotal supports for said fender, said supports being normally folded beneath the car, means within the control of the motorneer or driver for advancing said guard to the limit of its sliding movement and swinging the same forward upon its pivots to a point above the track in front of the car, substantially as described.

2. The combination, with a car, of a fender or guard arranged upon slidable and swinging supports beneath the car-body, and means within the control of the motorneer or driver for advancing said fender to the limit of its sliding movement and simultaneously swinging the same downward in front of the car, substantially as described.

3. The combination, with a car, of a folding fender or guard, slidable and swinging supports for said fender, and means within the control of the motorneer or driver for advancing said fender to the limit of its sliding movement and simultaneously swinging the same upon its pivots to a position in front of the car, substantially as described.

4. The combination, with a car, of a folding fender or guard arranged upon sliding and swinging supports beneath the car-body, and means within the control of the motorneer or driver for advancing said fender to the limit of its sliding movement and simultaneously swinging the same downward to a substantially horizontal position in front of the car, substantially as described.

5. A fender or guard for street-cars, comprising a swinging frame slidably supported beneath the car-body, a folding member carried thereby, and means within the control of the motorneer or driver for advancing said frame to the limit of its sliding movement and simultaneously swinging the same down to a point near the track in front of the car, substantially as described.

6. The combination, with a car of a fender or guard, folding means whereon said fender is slidably and pivotally supported beneath the car, and means within the control of the motorneer or driver for advancing said fender to the limit of its sliding movement and simultaneously swinging the same down to a point near the track in front of the car and retracting said fender to its normal position, substantially as described.

7. The combination, with a car, of a fender or guard supported thereby, an operative mechanism within the control of the driver or motorneer and connecting said fender and the brake-beams on said car, whereby the movement of said mechanism to thrust or project the fender in front of the car, will simultaneously set the brakes and independent mechanism, permitting also the movement of said brakes independently of said fender.

8. The combination, with a car, of a fender or guard supported by said car, a lever, means operated by a single movement of said lever in one direction for projecting said fender over the track in front of the car and simultaneously setting its brakes, and by a movement of said lever in the opposite direction returning said fender and releasing said brakes, substantially as described.

9. The combination, with a car, of a fender or guard slidably supported beneath the car-body, toggle-levers pivotally arranged beneath the car-body and connected with said fender, an operating-lever for the motorneer or driver, and means connecting said operating-lever and said toggle-levers for operating said fender, substantially as described.

10. The combination, with a car, of a fender or guard slidably supported beneath the car-body fender-levers supported beneath the car and connected with said fender, whereby the same will be advanced or withdrawn when said levers are operated, an operating-lever connected with the fender-levers, the brakes beneath the car, and means connecting said brakes with said operating-lever, whereby when said lever is moved, said brakes and said fender will be operated, for the purpose set forth.

11. The combination, with the car, of the fender comprising folding parts, the parallel links supporting said folding parts, and means for swinging said links and parts to project and distend the fender parts, or raise and fold the same beneath the car, substantially as described.

12. The combination, with the car, of the fender, the parallel links supporting said fender and having their upper ends slidable or movable beneath the car, guides therefor, means for moving the upper ends of said links forward, and a suitable mechanism for swinging or operating said links and fender, substantially as described.

13. The combination, with the car, of the fender, the parallel links supporting said fender and having their upper ends slidable or movable beneath the car, guides therefor, means for moving the upper ends of said links forward, a suitable mechanism for swinging or operating said links and fender, and the buffers wherewith the rear ends of the fender engage, as and for the purpose specified.

14. The combination, with the car, of the guides thereon, the links movable in said guides and swinging therefrom, the fender-frame supported by said links, the automatic springs acting upon said links, the operating-lever, and the toggle-levers connected therewith and with said fender-frame, as and for the purpose specified.

15. The combination, with the car, of the fender-frame 4 having pivotal and sliding connections with the car the frame 8, pivotally connected to said frame 4, the netting or apron between said frames, and the operating mechanism, substantially as described.

16. The combination, with the car, of the fender folding beneath the same, the operating mechanism, the car-brake mechanism connected with said operating mechanism, to be actuated by or during the final movement thereof, simultaneously with the projection of said fender, substantially as described.

17. The combination, with the car, of the fender having pivotal and sliding connections with the car, the toggle-levers 11 pivoted upon the car and upon said fender, the operating-lever, the rod 23, and the minor toggle-lever connecting said rod with said levers 11, as and for the purpose specified.

18. The combination, with the car, of the fender having pivotal and sliding connections with the car, the toggle-levers 11 pivoted upon the car, and upon said fender, the operating-lever, the rod 23, the minor toggle-lever connecting said rod with said levers 11, the brakes, the brake-rod 26, and the sliding connection between said rod 26 and said rod 23, whereby upon the projection of the fender the brakes are set, substantially as described.

19. The combination, with a car, of a folding fender or guard, folding means whereon said fender is pivotally and slidably supported beneath the car, means within the control of the motorneer or driver for advancing said fender to the limit of its sliding movement and swinging the same down to a point near the track in front of the car and withdrawing said fender to its normal position, substantially as described.

In testimony whereof I have hereunto set my hand, this 1st day of March, 1898, at Minneapolis, Minnesota.

JAMES H. ROBINSON.

In presence of—
C. G. HAWLEY,
M. E. GOOLEY.